(12) United States Patent
Tracy et al.

(10) Patent No.: US 6,257,404 B1
(45) Date of Patent: Jul. 10, 2001

(54) PRINTABLE BLANK OF IMPROVED DURABILITY FOR FORMING VIDEO CASSETTE BOXES

(75) Inventors: Peter H. Tracy, KeyWest, FL (US); Peter Atkinson, Bradford, CT (US)

(73) Assignee: Neato, LLC., East Haven, CT (US)

( * ) Notice: Subject to any disclaimer, the term of this patent is extended or adjusted under 35 U.S.C. 154(b) by 0 days.

(21) Appl. No.: 09/406,515

(22) Filed: Sep. 28, 1999

Related U.S. Application Data

(63) Continuation-in-part of application No. 09/193,329, filed on Nov. 16, 1998.

(51) Int. Cl.$^7$ .................................................. B65D 77/24
(52) U.S. Cl. .................... 206/232; 206/387.1; 229/193
(58) Field of Search ................................ 229/193, 116.1; 206/387.1, 232; 400/83

(56) References Cited

U.S. PATENT DOCUMENTS

| | | | |
|---|---|---|---|
| 1,591,427 | * 7/1926 | Leary | 229/193 |
| 3,073,217 | * 1/1963 | Spalding et al. | 493/55 |
| 4,445,634 | * 5/1984 | Sato | 206/387 |
| 4,682,974 | * 7/1987 | Sun | 493/55 |
| 4,688,673 | * 8/1987 | Yabe | 206/387 |
| 5,172,988 | * 12/1992 | Ledley et al. | 400/83 |
| 5,419,011 | * 5/1995 | Finke et al. | 206/387.1 |
| 5,560,484 | * 10/1996 | Tomisawa et al. | 206/387.1 |
| 5,794,631 | * 8/1998 | Sylvester | 206/387.1 |
| 6,065,599 | * 5/2000 | Lincoln | 206/387.1 |

* cited by examiner

Primary Examiner—Stephen P. Garbe
(74) Attorney, Agent, or Firm—Allen D. Brufsky, P.A.

(57) ABSTRACT

A blank having a defined pattern of reduced strength, allowing separation along said defined pattern, the pattern defining a video cassette box from a single sheet having first and second face portions, one or more side flaps for forming a parallelepiped, one or more reinforcing tabs for increasing the durability of the box and one or more top tabs for forming an enclosure at one end of the box.

13 Claims, 7 Drawing Sheets

(Interior Side)

(Exterior Side)

PRINTABLE BLANK OF IMPROVED DURABILITY FOR FORMING VIDEO CASSETTE BOXES

CONTINUING DATA/INCORPORATED MATTER

This application is a CIP of application Ser. No. 09/193,329, which is hereby incorporated by reference, dated Nov. 16, 1998.

BACKGROUND OF THE INVENTION

1. Field of Invention

This invention relates to a computer printable blank for forming a video cassette box for housing and identifying home videos and the like. More specifically, this invention relates to such blanks having improved durability.

2. Description of the Prior Art

Video cassettes containing movies or instructional media have been provided and stored in a rigid plastic material case, the case having a hinged lid enabling one to gain access to the cassette. This was satisfactory when the video cassette was provided in a read only form from a manufacturer or distributor such as a video rental store. Nowadays such cassettes are provided in a read and write form or in blank for copying of video TV programs or making home videos of various events. Users therefore, need to be able to identify the contents of such video cassettes and if necessary to vary the list of contents when changes are made on the cassette.

Computer programs can be written to enable a list of or the nature of the material on a video cassette to be identified which may be placed on the cassette container to identify its contents. But, the rigid pre-formed container cannot be passed through a conventional computer printer.

Application Ser. No. 09/193,329 addresses this problem by providing the contents of the video cassette to be printed out on a flat substrate such as a piece of paper or a blank which can then be folded, and with adhesive joined to form a container box to hold the cassette, with the printed list of contents appearing on one or both flat faces of the container or box.

Further, it discloses that the blank can be dimensioned to fit all size computer printers by trimming its edges before use or by trimming them after printing to take advantage of a "bleed" of ink across of the trim boundary, so that the finished graphic design on the box will transcend the edges to appear professional and finished.

SUMMARY OF THE INVENTION

This invention is an improvement of the above invention. It provides a blank, which when formed into a container or box for VCR cassettes, results in a more durable finished product by strategically increasing the overall area of bonding surfaces as well as the overall thickness of respective portions of the resulting container without impairing its ability to be passed through a printer; and by providing strategically located adhesive surfaces, which improve the durability of the respective bonds and portions while minimizing exposed adhesive surfaces after formation of the box that may interfere with insertion and removal of cassettes.

Increased thickness of portions of the front and rear faces at the entry portion of the formed box increases the durability of the respective portions of the faces. Increased thickness at the ends of the connecting side flaps that define a finger cut-out, allows the finger cut-out to be formed deeper so as to increase the gripping surface of an exposed cassette contained in the box, making removal of a cassette contained therein easier. Adhesive locations are provided that improve durability while minimizing exposed adhesive after formation of the box.

Therefore, according to the invention there is provided a flat sheet capable of being passed through a printer to be provided with printed matter, the sheet being marked so that it can be folded and parts of the sheet separated for assembly of the box. When folded, the sheet or blank provides substantially flat faces for the cassette or box joined to one another along fold lines and a closure at one end of the resulting box, the printing being intended to be on one or both of the faces, but alternatively up to substantially the entire outside surface area of the resulting box.

End-side flaps extend from the front and rear faces and are positioned to overlie and be adhesively connected to each other when forming the container. A middle-side flap between the front and rear faces is formed along folded lines. Top tabs on the top of the front and rear faces can be pushed out of line with their respective face and are positioned to overlie and be adhesively connected to each other and receive and trap one or more side tabs of one or more side flaps after they have been folded, thereby holding the box together. One or more flap or tab faces and/or underlying surfaces may be provided with an adhesive or adhesive area to adhere to an overlying or underlying surface for bonding purposes.

When such a sheet is folded and assembled it forms a parallelepiped having an open top between the two parallel faces, one or both faces having a reinforcing flap extending therefrom for folding and adhering to the inside or outside surface of the front and/or rear faces to increase the thickness and durability of the respective areas.

Finger cut-outs may be provided at a terminal end of the middle-side flap and at a corresponding terminal end of one or more end-side flaps for spreading the faces and for gripping a cassette for easy insertion and removal of the cassette. Providing finger cut-outs for both end-side flaps allows two layers of overlapping material to define the resulting exposed area when the box is formed, resulting in improved durability at a location that may otherwise be more susceptible than the exposed area from the middle-side flap to wear and tear from repetitious insertion and removal of cassettes. Thus, the size of the finger cut-out may now be increased to in turn increase the gripping area of an exposed cassette for easier removal thereof. A trapezoidal shape is used, as it provides a wide area of exposure. However, almost any alternative shape may be used insofar as it allows sufficient gripping of an exposed portion of a cassette.

The various flaps and tabs that are connected to each other to form the container are generally provided to be as square or as rectangular in shape as possible to increase the surface area for adhering. In turn, this provides an overall stronger bond and overall thicker respective wall; and thereby, a more sturdy container that can withstand the wear and tear encountered from repeated insertion and removal of cassettes.

It is desirable that the piece of paper or blank be of a conventional size to fit in most, if not all, printers. The preferred width is 8½ inches, which most, if not all, printers will accept.

The size of the interior of the assembled box should be such that the cassette fits reasonably tightly in the assembled box. In a preferred embodiment the overall shape of the portions of the blank which are to make the box are delineated within the overall blank and surrounding portions are discarded after printing in a conventional printer and before the assembly of the box.

The delineation of the sheet or blank material which is to be used as the box can be achieved by printing appropriate lines and then cutting away the excess material. Preferably however the delineation is achieved by partial severing of the sheet so that after printing a user can quickly remove the excess sheet or blank material. This can readily be achieved by a stamping of the sheet with cut lines or perforations which do not completely sever the parts of the sheet so that the sheet remains in one piece during normal heading and passage through the printer, but can be separated easily by tearing when required.

It is also preferable that the various fold lines between the two faces and the flaps be marked by printing and may also conveniently be achieved by scoring, which allows for simple and accurate folding.

BRIEF DESCRIPTION OF THE DRAWINGS

The invention will now be described, by way of example, with reference to the accompanying drawings.

DESCRIPTION OF PREFERRED EMBODIMENTS

Figure 1:
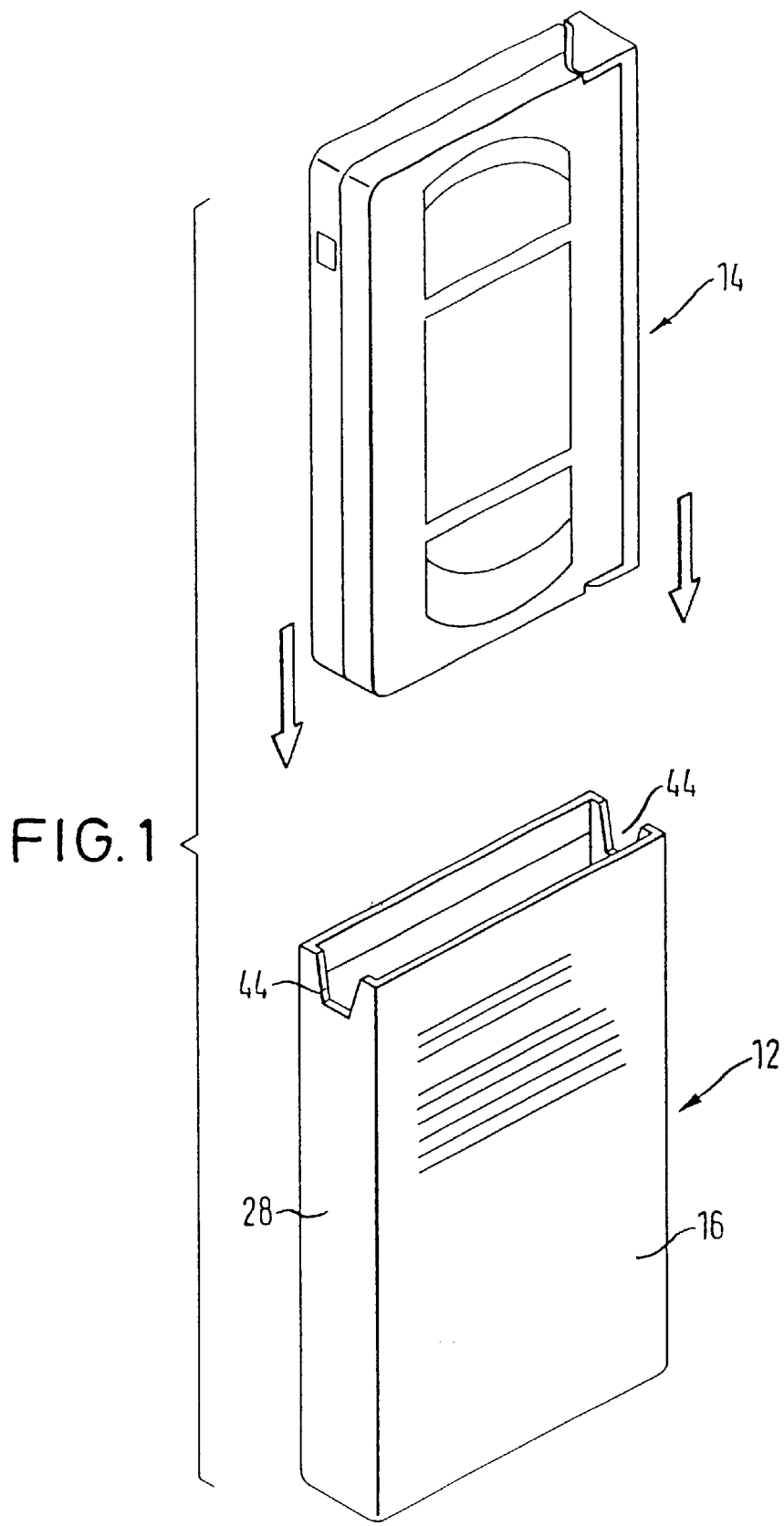
FIG. 1 is an exploded perspective view of a video cassette and video cassette box for housing the cassette, formed from the blank of the present invention.
Figure 2:
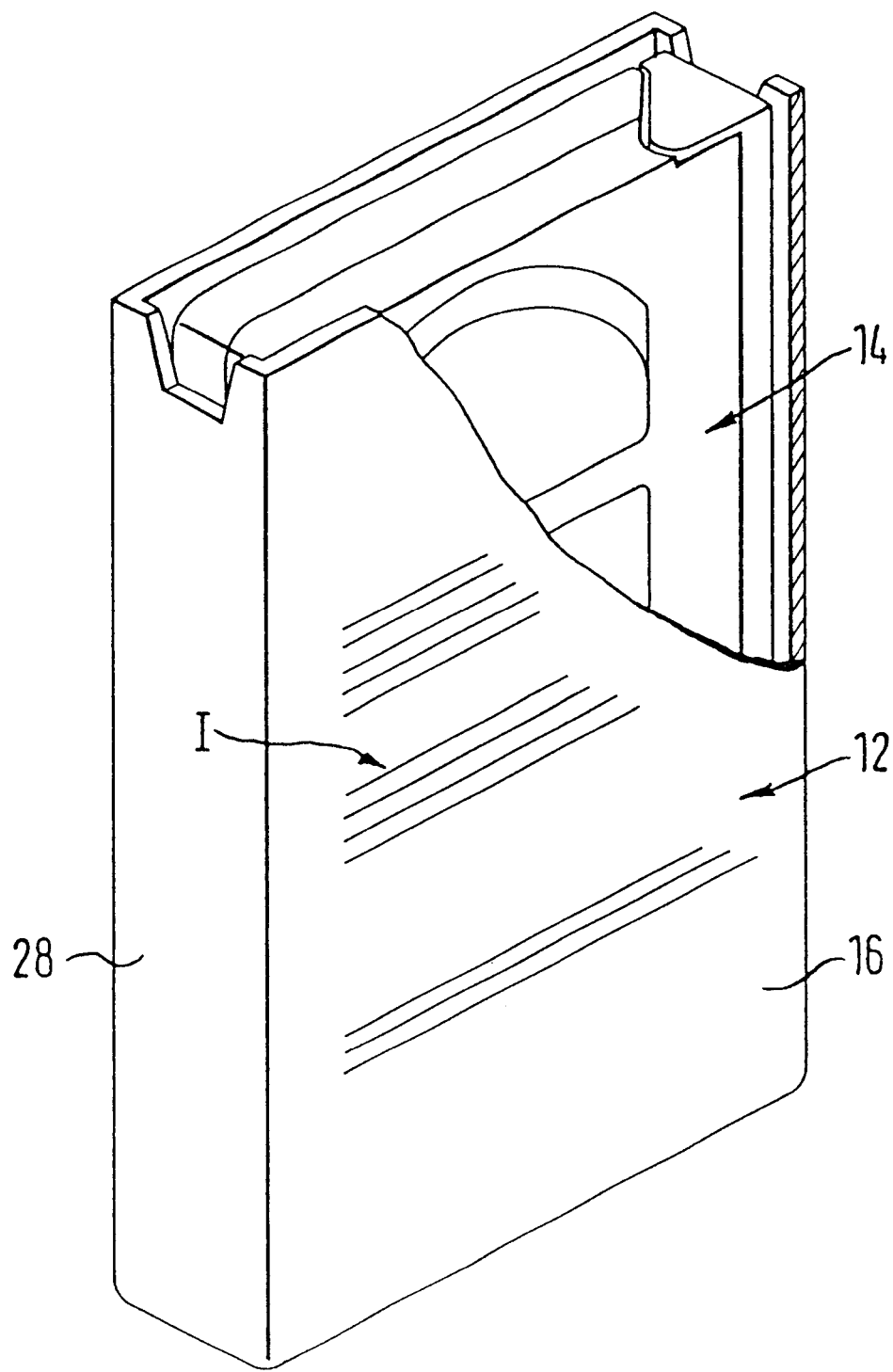
FIG. 2 is a perspective view, partially cut away of the housed cassette in the box of FIG. 1.
Figure 3:
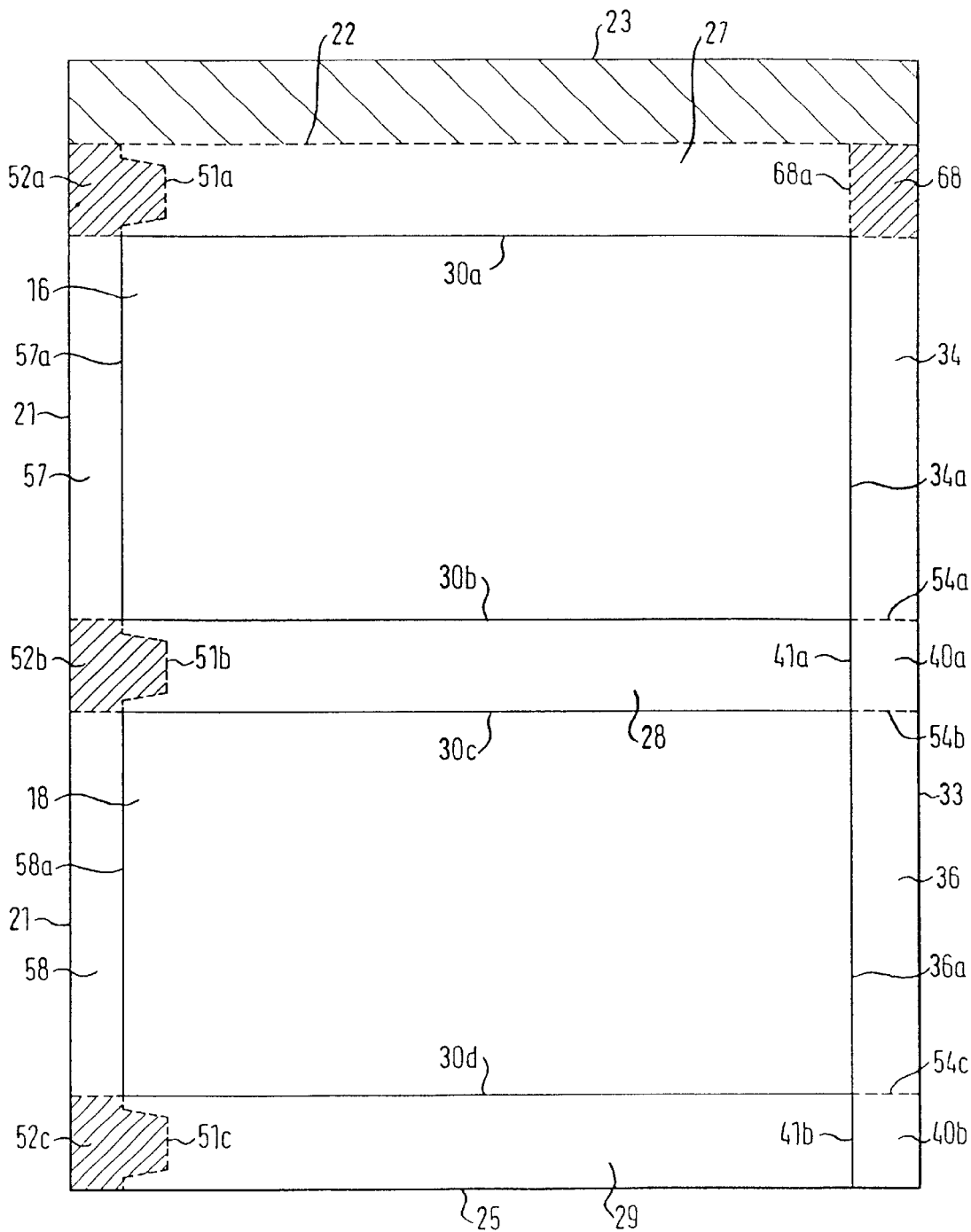
FIG. 3 shows the exterior side of a sheet or blank according to an embodiment of the present invention for forming the box.

The sheet or blank 10 shown in FIG. 3 is desirably of thin or light paperstock and approximately 215.9 mm or 8½ inches in width. It is provided with a number of partially cut or perforated lines as described below which keep the sheet or blank in one piece for standard printing on a computer but from which excess portions can readily be separated or torn after printing to leave a major portion to be formed into the box 12 shown in FIGS. 1 and 2.

Figure 4:
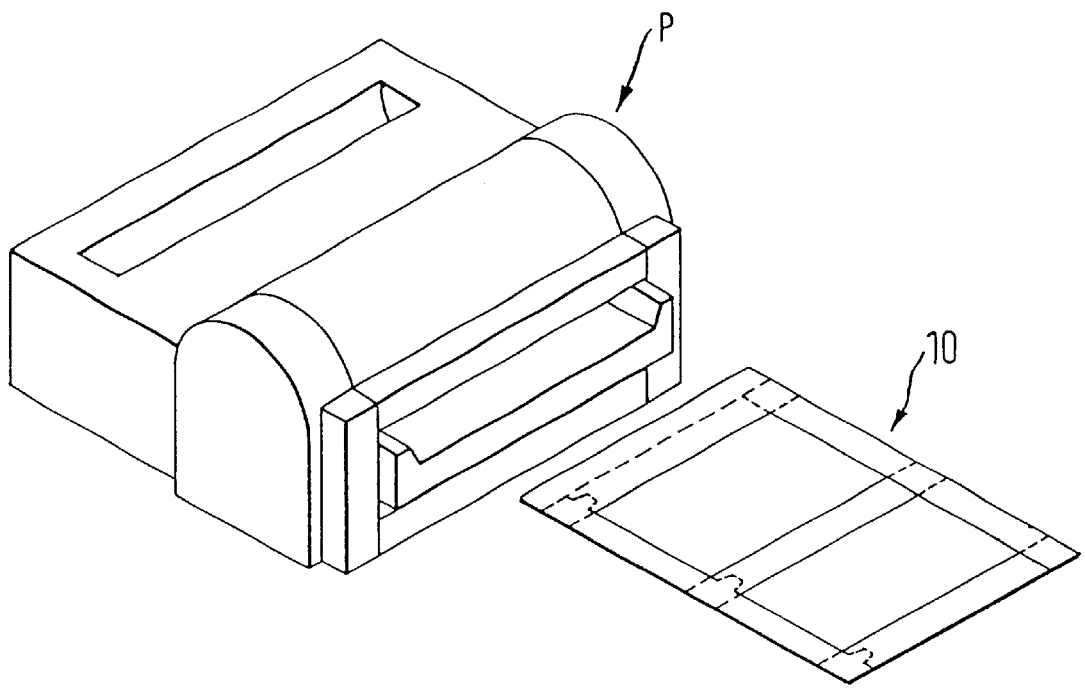
FIG. 4 shows the sheet or blank being inserted into a printer for printing.

Printing can be provided on any or substantially all portions of the exterior side of sheet 10 by passing it through a computer printer P, as shown in FIG. 4. A suitable program can be provided to list the contents of a video cassette 14 and print that list of indicia I in one or both of the areas 16 and 18 along with graphics and/or text with indicia I in the correct orientation or position to be readable in the finished cassette box 12. Further, various graphics and/or text, including the contents of a video cassette may be printed, whether for utility or decorative purposes, on any other portion of the box 12, such as printing the category to which the subject matter contained on the cassette pertains, on either an end-side flap, the middle side-flap (or spine of the resulting container), or a top tab. The computer instructions or software program allows a user to choose portions of the sheet to have printed material placed thereon. To achieve consistent printing results, a user feeds a sheet in a specified direction into a printer.

Referring to FIG. 3, cut line 22 is provided near top edge 23 of the sheet or blank 10 for trimming the blank after printing or "bleeding" over the edge 22 by the computer printer P.

Irregularly shaped finger cut-out lines 51a, 51b and 51c are provided for trimming after printing or bleeding to form finger cut-outs 52a, 52b and 52c and reinforcing flaps 57 and 58, which fold along score lines 57a and 58a, respectively.

Figure 5:
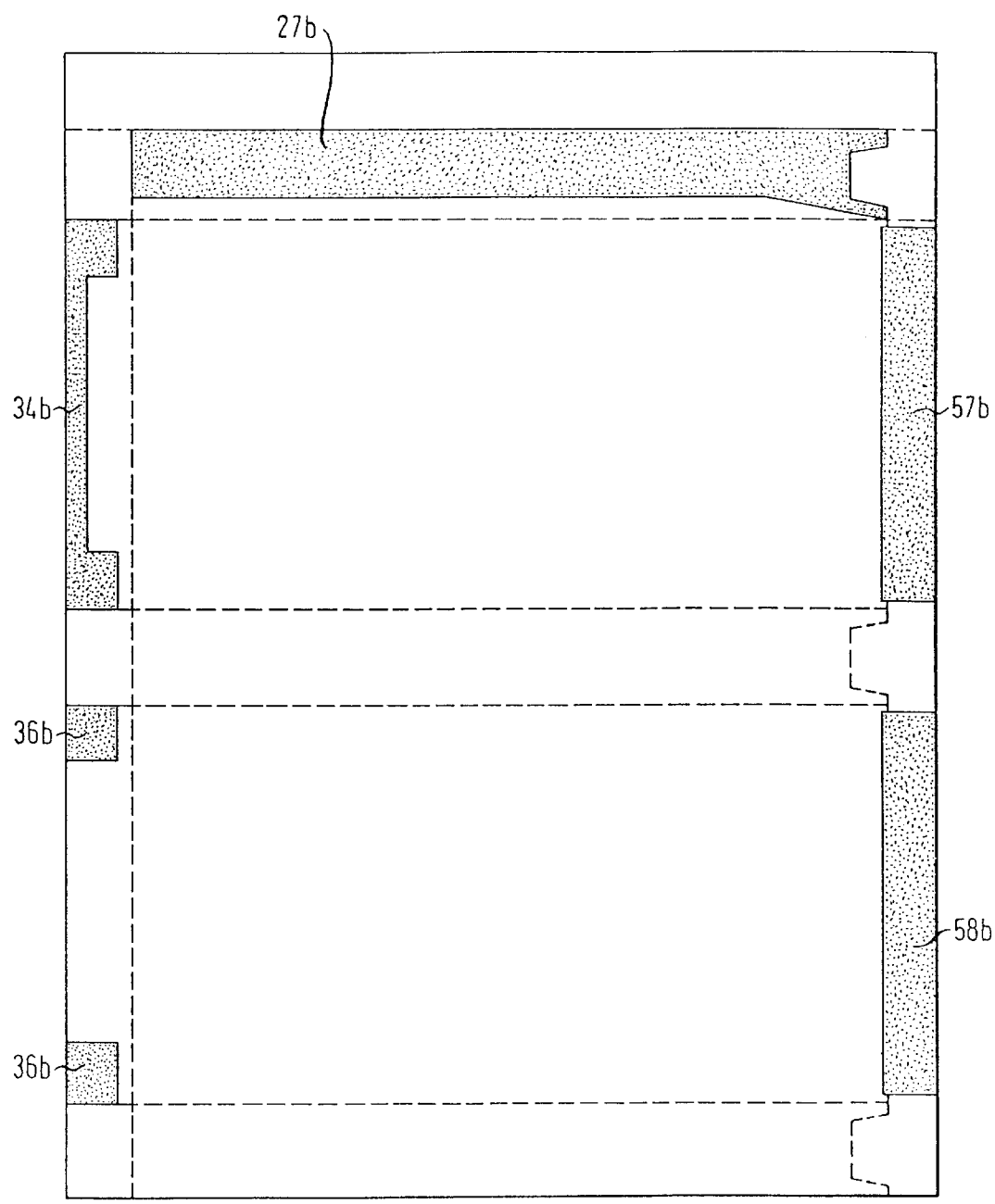
FIG. 5 shows the interior side of a sheet or blank with identified peel-away portions of non-adhesive layers according to an embodiment of the present invention.

Cut line 22, irregularly shaped finger cut-out line 51a and cut line 68a (discussed below) define end-side flap 27 and facilitate its folding along score line 30a. An adhesive area or strip or layer for adhering the interior side of end-side flap 27 to the exterior side of end-side flap 29 may be provided; and is preferably located on the interior side of end-side flap 27 and effectuated by an adhesive layer underlying a removable non-adhesive layer, the shape and location of which is shown in FIG. 5 as element 27b.

L-shaped cut line 68a is provided for separation after printing or bleeding to form, in cooperation with cut line 22, rectangular cut-out 68, which is removed after printing and before forming the box.

Cut lines 54a, 54b and 54c are provided for separation along those lines after printing or bleeding: cut line 54a and cut line 68a define top tab 34 and facilitate its folding along score line 34a; cut lines 54a and 54b define side tab 40a and facilitate its folding along score line 41a; and cut lines 54b and 54c define top tab 36 and facilitate its folding along score line 36a. The adhesive areas or strips or layers for forming the top of the box are discussed below.

Cut line 54c and score line 41b define side tab 40b and facilitate its folding along score line 41b.

Irregularly shaped finger cut-out line 51c and score line 41b define side flap 29 and facilitate its folding along score line 30d.

Score lines 30a, 30b, 57a and 34a define front face 16, and score lines 30c, 30d, 58a and 36a define rear face 18, with side flaps 27 and 28 integral with the front face 16 and side flaps 28 and 29 integral with the rear face 18.

After printing text and/or graphics on the exterior of the box, the user tears the stock along the lines 22, 51a, 68a, 51b, 54a, 54b, 51c and 54c to remove the excess portions respectively identified in FIG. 3 as the shaded portions; and then folds the respective portions of the blank 10 along score lines 30a, 57a, 34a, 30b, 30c, 58a, 36a, 30d, and 41b, which "preps" the printed box for assembly.

Adhesive areas or strips or layers for adhering reinforcing flaps 57 and 58 to the interior or exterior side of the box may be provided; and are preferably located on the interior sides of flaps 57 and 58 for adhering the reinforcing flaps to the interior of the box and effectuated by an adhesive layer underlying a removable non-adhesive layer, the preferred shapes and locations of which are shown in FIG. 5 as elements 57b and 58b, respectively. The user removes non-adhesive layers 57b and 58b, which expose an adhesive layer of the same shape, then folds the reinforcing flaps along score lines 57a and 58a against respective portions of the printed box.

An adhesive area or strip or layer for adhering end-side flaps 27 and 29 together may be provided; and is preferably located on the interior side of end-side flap 27 and effectuated by an adhesive layer underlying a removable non-adhesive layer, the shape and location of which is shown in FIG. 5 as element 27b. The user removes non-adhesive layer 27b, and then folds end-side flap 27 around, with score lines 30b and 30c folded in the same direction, to engage the exterior side of end-side flap 29 so that the two end-side flaps are adhered together with end-side flap 27 aligned directly on top of end-side flap 29. It should be noted that a single end-side flap may be used, and adhered an exterior portion of the box to form the box, but the preferred embodiment utilizes two end-side flaps.

An enclosure or closed end of the box is formed by the engagement of top tabs 34 and 36 and side tabs 40a and 40b. Each tab is folded inwards to form the enclosure, the plane of which is approximately normal to the planes of faces 16 and 18; and is secured via one or more adhesive areas or strips or layers, which may be located on either or all of the tabs. The tabs may be layered in any order so long as the enclosure is secure. The preferred adhesion function is effectuated via adhesive layers, on the interior sides of top tabs 34 and 36, underlying removable non-adhesive layers, the shapes and locations of which are shown in FIG. 5 as elements 34b and 36b, respectively. In the preferred method of engagement (layering), the side tabs, which have no adhesive features, are layered first. Next, the user removes non-adhesive layers 36b and engages the interior side of top tab 36 with the exterior sides of side tabs 40a and 40b. Next, the user removes non-adhesive layer 34b and engages the interior side of top tab 34 with the exterior side of top tab 36 to complete the enclosure. It should be noted that a single tab may be used, and adhered to a portion of the box to form the enclosure, but the preferred embodiment utilizes two top tabs and two side tabs to form a more sturdy enclosure.

To help a user form the box, step-by-step directions may printed in the interior of the blank since the interior side will not be visible after the box is formed. Also, the respective portions to be discarded may identified as such via printing on their respective interior sides. Lastly, hash marks may be printed on the interior portion of the box as reference marks to adjust printer feeds for alignment of graphics and/or text.

Figure 6:
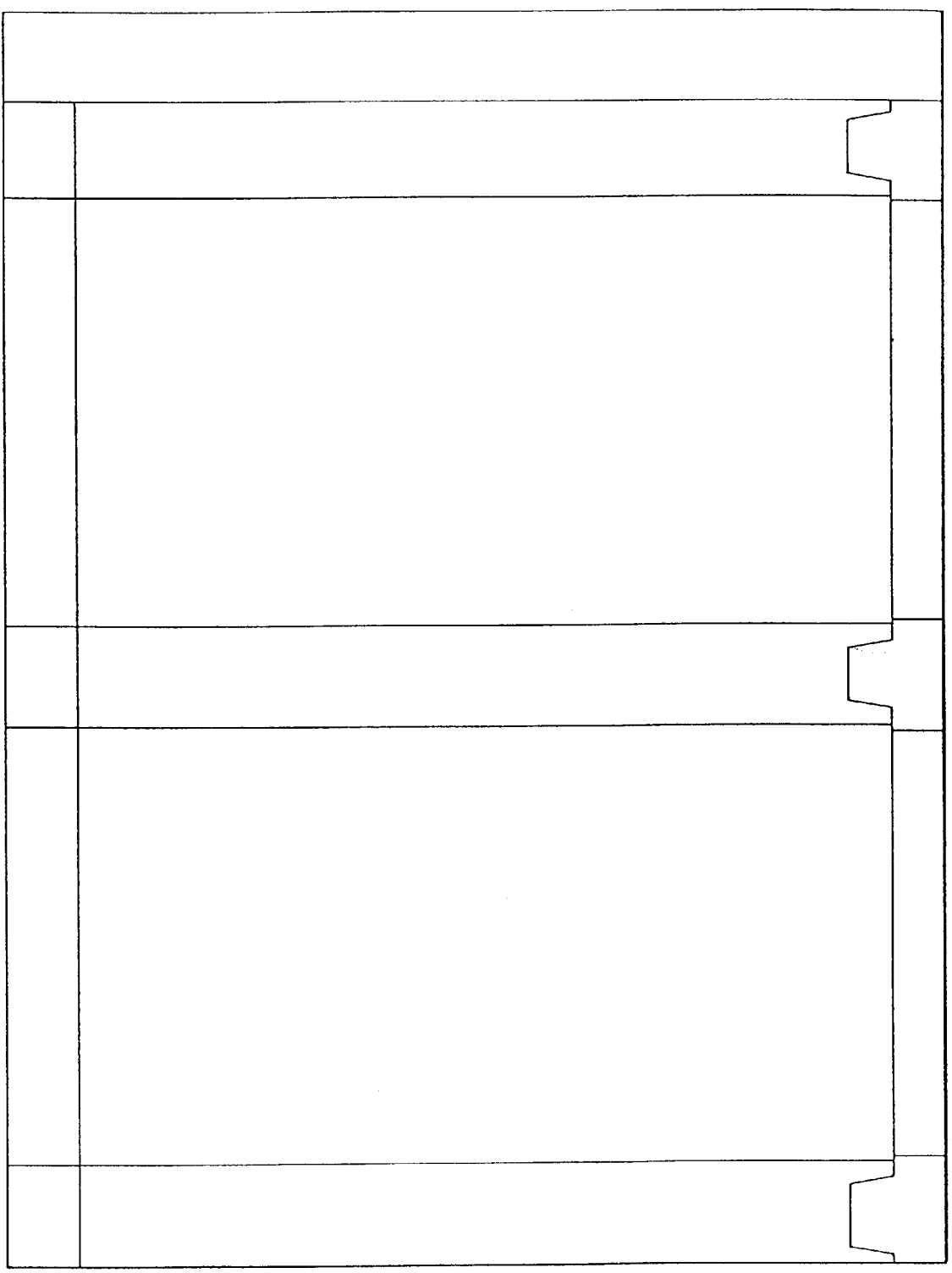
FIG. 6 shows the schematics for tooling a cutter to form the exterior side of a sheet or blank.
Figure 7:
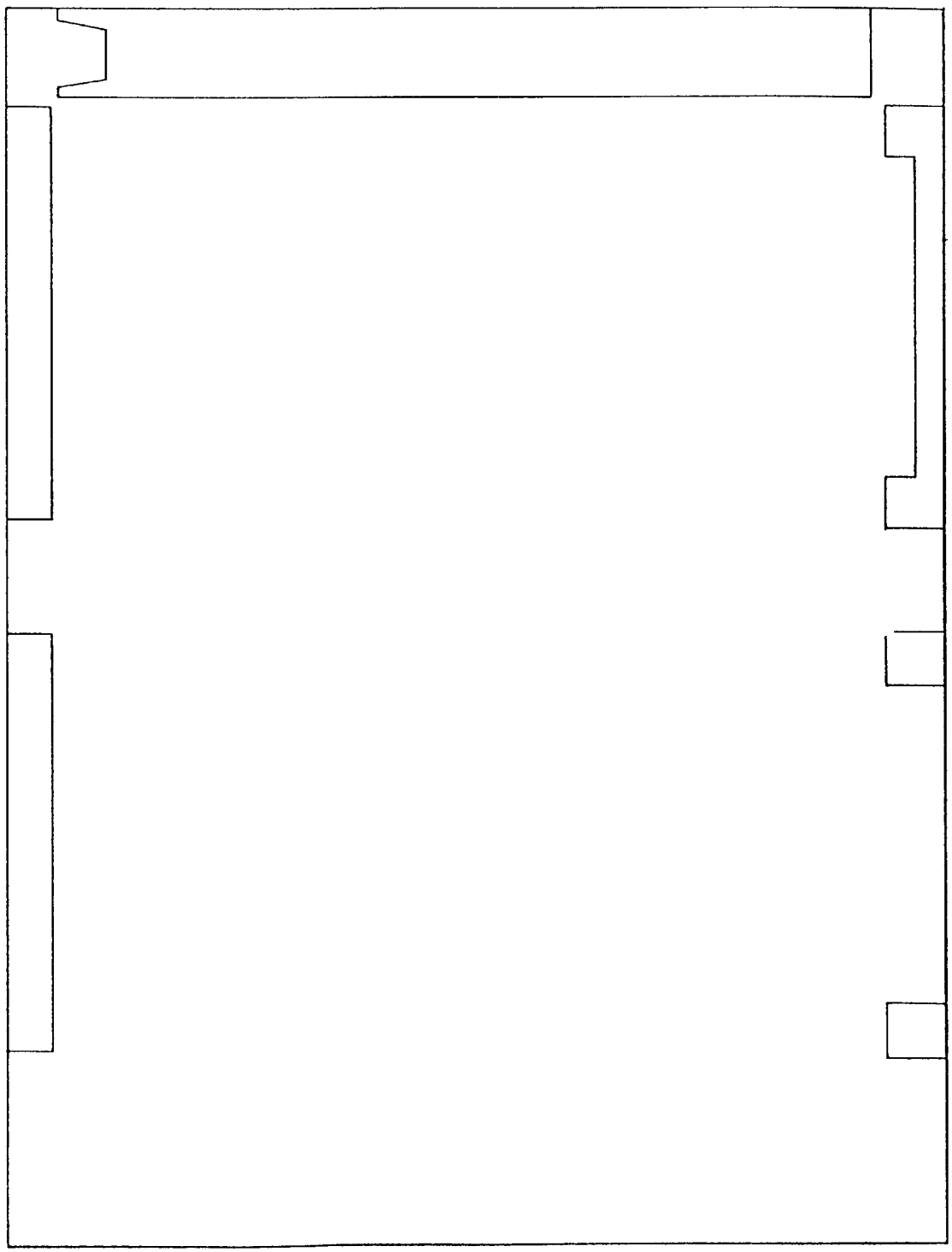
FIG. 7 shows the schematics for tooling a cutter to form the interior side of a sheet or blank.

FIGS. 6 and 7 show the schematics for tooling a cutter to form the exterior and interior sides of a sheet or blank, respectively.

FIGS. 6 and 7 show dimensions in mm of one embodiment of the invention, and are presented herein to provide guidance in carry out the invention. It should be noted that FIG. 5 shows an embodiment slightly different from that shown in FIG. 7; specifically, it shows slight modifications to 27b, 57b and 58b. The shape of removable non-adhesive layer 57b is modified to better facilitate folding of end-side flap 27 by preventing the exposed adhesive layer from interfering with the folding, and the width of layers 57b and 58b is increased to 13.0 mm to provide a stronger bond between the reinforcing tabs and their respective portions of the box.

As can be seen, the arrangement is quick, simple, avoids problems during printing and is sturdy to withstand repetitious use.

The embodiments described above are merely illustrative in nature, and are in no way intended to limit the claims in a way contrary to the spirit of the invention. For example, while use of an adhesive is preferred to connect the various flaps and tabs, a plurality of other means may be employed without departing from the spirit of the invention; such as glue, tape, staples, interconnecting flaps and/or tabs, etc.

Therefore, we claim:

1. A printable blank having a defined pattern of reduced strength, allowing separation along said defined pattern, said pattern defining a box for a video cassette comprising a single sheet having
   first and second face portions adapted to have printed material placed thereon by a printer controlled by computer instructions stored on a computer readable medium,
   an end-side flap terminating at a first edge of said sheet and adapted to be folded and secured to a second edge, opposite said first edge, to form a parallelepiped,
   one or both face portions having a reinforcing tab terminating at a third edge of said sheet, said third edge adjacent to said first and second edges, a reinforcing tab being adapted to be folded and secured to a portion of its respective face portion, and
   one or both face portions having a top tab terminating at a fourth edge of said sheet, said fourth edge opposite said third edge, a top tab being adapted to adhere to a portion of the blank to form an enclosure at said fourth edge of said parallelepiped.

2. The blank according to claim 1, wherein said sheet is formed of paper.

3. The blank according to claim 1, wherein said pattern is formed by perforation of said blank.

4. The blank according to claim 1, wherein said sheet further comprises a pair of score lines, each of said lines defining a folding axis for said parallelepiped.

5. The blank according to claim 1, wherein said pattern has letter size dimensions.

6. The blank according to claim 1, wherein said pattern has A4 size dimensions.

7. The blank according to claim 1, wherein said first and second face portions are separated by a pair of parallel score lines defining a middle-side flap.

8. The blank according to claim 1, wherein said blank has an exterior side and an interior side, wherein substantially all of said exterior side is adapted to have text and/or graphics placed thereon by a printer controlled by computer instructions.

9. The blank according to claim 1, wherein said blank has an exterior side and an interior side, wherein substantially all of said exterior side is adapted to have text and/or graphics placed thereon by ink.

10. The blank according to claim 1, wherein said blank further comprises a score line defining a folding axis for said top tabs.

11. The blank according to claim 1, wherein said blank further comprises at least two finger cut-outs along said third edge of said blank.

12. The blank according to claim 1, wherein said blank further comprises three finger cut-outs along said third edge of said blank, wherein two of said cut-outs overlap each other upon formation of the box and cooperatively define a single slot.

13. A printable VCR cassette box kit comprising
   a printable blank having a defined pattern of reduced strength, allowing separation along said defined pattern, said pattern defining a box for a video cassette comprising a single sheet having
      first and second face portions adapted to have printed material placed thereon by a printer controlled by computer readable instructions,
      an end-side flap terminating at a first edge of said sheet and adapted to be folded and secured a second edge, said second edge opposite said first edge, to form a parallelepiped,
      one or both face portions having a reinforcing tab terminating at a third edge of said sheet, said third edge adjacent to said first and second edges, a reinforcing tab being adapted to be folded and secured to a portion of its respective face portion, and one or both face portions having a top tab terminating at a fourth edge of said sheet, said fourth edge opposite said third edge, a top tab being adapted to adhere to a portion of the blank to form an enclosure at said fourth edge of said parallelepiped; and computer instructions stored on a computer readable medium that operatively control a printer to print graphics and/or text on said sheet.

* * * * *